United States Patent
Kim et al.

(10) Patent No.: US 12,522,630 B2
(45) Date of Patent: Jan. 13, 2026

(54) MRNA CAP ANALOG AND USES THEREOF

(71) Applicant: HANMI FINE CHEMICAL CO., LTD., Siheung-si (KR)

(72) Inventors: Na Ri Kim, Siheung-si (KR); Bo Sung Choi, Siheung-si (KR); Jin Mi Noh, Siheung-si (KR); Su Hyeon Min, Siheung-si (KR); Yong Gyu Jung, Siheung-si (KR)

(73) Assignee: HANMI FINE CHEMICAL CO., LTD., Siheung-si (KR)

( * ) Notice: Subject to any disclaimer, the term of this patent is extended or adjusted under 35 U.S.C. 154(b) by 0 days.

(21) Appl. No.: 18/852,777

(22) PCT Filed: Mar. 10, 2023

(86) PCT No.: PCT/KR2023/003327
§ 371 (c)(1),
(2) Date: Sep. 30, 2024

(87) PCT Pub. No.: WO2023/191342
PCT Pub. Date: Oct. 5, 2023

(65) Prior Publication Data
US 2025/0230183 A1    Jul. 17, 2025

(30) Foreign Application Priority Data

Mar. 31, 2022 (KR) .................. 10-2022-0040464
Aug. 24, 2022 (KR) .................. 10-2022-0106354

(51) Int. Cl.
*C07H 21/02* (2006.01)
*A61K 31/7105* (2006.01)
*C07H 1/00* (2006.01)

(52) U.S. Cl.
CPC ......... *C07H 21/02* (2013.01); *A61K 31/7105* (2013.01); *C07H 1/00* (2013.01)

(58) Field of Classification Search
CPC ....... A61K 31/7105; C07H 1/00; C07H 21/02
USPC ................... 435/6.1, 91.1, 91.31, 455, 458; 514/44 R; 536/23.1, 24.5
See application file for complete search history.

(56) References Cited

U.S. PATENT DOCUMENTS

| | | |
|---|---|---|
| 6,762,298 B2 | 7/2004 | Beaucage et al. |
| 7,074,596 B2 | 7/2006 | Darzynkiewicz et al. |
| 10,913,768 B2 | 2/2021 | Hogrefe et al. |
| 2014/0147454 A1 | 5/2014 | Chakraborty et al. |
| 2018/0273576 A1 | 9/2018 | Hogrefe et al. |
| 2021/0363172 A1 | 11/2021 | Kuhn et al. |
| 2023/0382943 A1 | 11/2023 | Kim et al. |
| 2024/0158433 A1 | 5/2024 | Hogrefe et al. |

FOREIGN PATENT DOCUMENTS

| | | |
|---|---|---|
| CN | 113603739 A | 11/2021 |
| EP | 4 140 491 A1 | 1/2023 |
| EP | 4393936 A1 | 7/2024 |
| KR | 10-2018-0050409 A | 5/2018 |
| KR | 10-2020-0143391 A | 12/2020 |
| KR | 10-2366490 B1 | 2/2022 |

OTHER PUBLICATIONS

U.S. Appl. No. 18/687,771 (Year: 2024).*
Strenkowska, Malwina et al., "Cap analogs modified with 1,2-dithiodiphosphate moiety protect mRNA from decapping and enhance its translational potential," *Nucleic Acids Research*, vol. 44, No. 20 pp. 9578-9590 (2016).
Strenkowska, Malwina et al., "Towards mRNA with superior translational activity: synthesis and properties of ARCA tetraphosphates with single phosphorothioate modifications," *New Journal of Chemistry*, 34, pp. 993-1007 2010).
Ishikawa, Masahide et al., "Preparation of eukaryotic mRNA having differently methylated adenosine at the 5'-terminus and the effect of the methyl group in translation," *Nucleic Acids Symposium Series*, No. 53, 129 (2009).
Notice of Allowance issued in KR Application No. 10-2023-0031991 on Jul. 20, 2024.
Non-Final Rejection issued in KR Application No. 10-2023-0031911 on Dec. 15, 2023.
China National Intellectual Property Administration, Office Action in Chinese Application No. 202380032262.3 (Mar. 5, 2025).

* cited by examiner

*Primary Examiner* — Jane J Zara
(74) *Attorney, Agent, or Firm* — Leydig, Voit & Mayer, Ltd.

(57) ABSTRACT

Provided are a compound of chemical formula 1, a cap analog comprising same, mRNA capped with the cap analog, a method for preparing mRNA by using the cap analog, a use of using the cap analog for preparing mRNA, and a pharmaceutical composition for expressing a target peptide or protein, comprising mRNA 5'-capped with the cap analog.

13 Claims, 2 Drawing Sheets

MRNA CAP ANALOG AND USES THEREOF

TECHNICAL FIELD

The present disclosure relates to a cap analog and a protein expression method using the same, and more particularly, to an mRNA cap analog, a 5'-capped mRNA including the same, a method for preparing the same, a pharmaceutical composition for expressing a target peptide or protein including the 5'-capped mRNA, and a method for producing a target peptide or protein by using the 5'-capped mRNA.

BACKGROUND ART

RNA therapeutics have recently been proposed as a new paradigm for treatment of infectious diseases and cancer. Particularly, the development of mRNA vaccines by using in vitro transcription is highlighted as the most promising method for dealing with RNA virus infectious diseases capable of overcoming limits of conventional vaccines such as attenuated, inactivated, and synthetic antigen vaccines. Because RNA virus infectious diseases are relatively highly transmissible and RNA viruses mutate rapidly due to their unstable structures, rapid development of highly safe vaccines therefor is required. mRNA vaccines may shorten the speed of vaccine development because mRNA vaccine candidate materials may be derived within one month in response to these infectious diseases and has a great advantage of excellent safety without the risk of genetic modification, because mRNA introduced into the body is decomposed within 24 hours and, unlike DNA vaccines, is translated into a protein by a ribosome in the cytoplasm without entering the nucleus of a cell.

For in vitro transcription of mRNA molecules, the following components are required: a linearized DNA template, an RNA polymerase (mainly T7 RNA polymerase), four ribonucleoside triphosphates (NTPs) A, G, C, and U (or 1-Methylpseudouridine (m1Ψ)), and a cap analog. If required, poly A polymerase may be used for polyadenylation of 200 to 250 adenosines at the 3' end, and a capping enzyme, instead of a cap analog, may be used to synthesize a 5' cap structure at the 5' end. Compared to other relatively optimized components, the 5' cap structure having a complex structure and playing an important role in protein translation by mRNA molecules accounts for the highest cost, and extensive research has been conducted into efficient synthesis thereof. mRNA undergoes a maturation process after transcription for effective translation of an encoded protein. In the process; a process of linking 7-methylguanosine ($^{7m}$G) to the 5' end of an mRNA molecule via a 5'- to 5'-triphosphate chain is referred to as a 5' cap process, and the linked structure is referred to as a 5' cap structure ($^{7m}$GpppN). The 5' cap structure may protect the 5' end of mRNA from biodegradation by 5' exonuclease and affects migration of mRNA from the nucleus to the cytoplasm. Particularly, the 5' cap structure is recognized by a eukaryotic translation initiation factor 4E (eIF4E) to form a translation initiation complex, playing an important in protein expression.

In order for this capped mRNA to be clinically applicable, it must have a structure (Cap1 mRNA) in which the 2' hydroxyl group of the first nucleotide linked to 7-methylguanosine via a 5'-triphosphate chain is methylated. When applying the unmethylated Cap0 structure, MDA5 (an intracellular sensor protein), which recognizes the Cap0 structure, recognizes the 2' hydroxyl group when an exogenous mRNA with a Cap0 structure is introduced into the body and induces an immune-inflammatory response, which impairs the bonding of the mRNA to eIF4E and thus inhibits protein expression. On the contrary, because exogenous Cap1 mRNA, in which the 2'OH is methylated, is not recognized by MDA5 even when introduced into the body, an immune response is not induced and relatively high expression of protein may be induced, and thus Cap1 mRNA is suitable for clinical trials.

Examples of mRNA vaccines commercialized based on the above-described Cap1 mRNA structure are mRNA-1273 of Moderna and BNT162b2 of Pfizer-BioNTech. Both mRNA vaccines were developed to deal with infectious diseases caused by severe acute respiratory syndrome coronavirus type 2 (SARS-CoV-2), an RNA virus that has caused a global pandemic. In the case of the BNT162b2 mRNA vaccine, a co-transcriptional capping method that is a method of synthesizing mRNA by simultaneously introducing a chemically synthesized cap analog during in-vitro mRNA transcription so that the cap analog constitutes the 5' end was adopted, instead of a conventional capping method using a capping enzyme, to reduce manufacturing costs.

A cap analog used in BNT162b2 is Cleancap® AG (3'OMe), as a third-generation cap analog, developed by TriLink Biotechnologies Inc. (U.S. Pat. No. 10,913,768). The cap analog is a trinucleotide cap analog having a structure of $^{7m}$G$_{(3'OMe)}$pppA$_{(2'OMe)}$pG and may be introduced during mRNA synthesis to synthesize a Cap1 mRNA structure without using an enzyme. Because the trinucleotide cap analog includes at least one more base than GTP, base pairing hydrogen bonding force of the trinucleotide cap analog in base pairing for initiation of transcription with a strand of a DNA template is stronger than that of GTP. Therefore, unlike a previous second-generation cap analog (U.S. Pat. No. 7,074,596) that is a dinucleotide cap analog pairing with a DNA template competitively with guanosine triphosphate (GTP), the trinucleotide cap analog may base pair with the DNA template preferentially over GTP and thus reduce the amount of added cap analog during in vitro mRNA transcription, thereby reducing mRNA impurities having a pppG 5' end.

A shortage of raw materials was once experienced for a while because demand for BNT162b2 including the trinucleotide cap analog exploded to deal with the global Covid-19 pandemic. Also, the cap analog still accounts for the highest cost in mass production of mRNA vaccines. In order to manufacture mRNA vaccines to appropriately deal with infectious diseases caused by highly transmissible RNA viruses, rapid and economical production and supply of cap analogs are required.

A manufacturing process of currently commercialized trinucleotide cap analogs is briefly divided into 6 steps as shown below (U.S. Pat. No. 10,913,768).

[Reaction Scheme 1]

G$_{(3'OMe)}$ ⟶ pG$_{(3'OMe)}$ ⟶ Im-pG$_{(3'OMe)}$ ⟶ ppG$_{(3'OMe)}$ ⟶ pp$^{7m}$G$_{(3'OMe)}$ ⟶ Im-pp$^{7m}$G$_{(3'OMe)}$ ⟶ pN$_{(2'OMe)}$pN ⟶ $^{7m}$G$_{(3'OMe)}$pppN$_{(2'OMe)}$pN

In Reaction Scheme 1, the G is guanosine, $^{7m}$G is 7-methylguanosine, N is one of adenosine, cytidine, guanosine, and uridine, p is —P(=O)O$_2$—, Me is methyl, and Im is imidazolide. Moreover, specifically, a long process of at least 10 steps needs to be performed if a step of synthesizing pN$_{(2'OMe)}$pN, which is a reactant used in a final manufacturing step, is included.

Particularly, a main factor of increasing production costs and synthesis period in the entire manufacturing process for mass production of the TriLink's cap analog is purification steps using ion-exchange chromatography (mainly, DEAE resin) performed between the steps of the manufacturing process. After purifying an intermediate of each process, a large amount of a buffer solution (mainly triethylammonium bicarbonate (TEAB) buffer) used in column purification needs to be distilled to perform a next step in an organic solvent. Because purification is required at each step of producing pG$_{(3'Ome)}$, ppG$_{(3'oMe)}$, pp$^{7m}$G$_{(3'ome)}$, pN$_{(2'oMe)}$pN, and $^{7m}$G$_{(3'OMe)}$pppN$_{(2'OMe)}$pN in the entire manufacturing process, a total of 5 ion-exchange column purifications are required. This long process, the column purifications, and the distillation of the buffer solution increase the time and cost for manufacturing the cap analog, thereby lowering economic feasibility.

DISCLOSURE

Technical Problem

Provided is a cap analog capable of increasing in vitro synthesis efficiency of 5'-capped mRNA molecules, increasing protein expression efficiency of capped mRNA, and economically produced by reducing the number of steps of cap analog synthesis and the number of purification processes.

Provided is mRNA 5'-capped with the cap analog.

Provided is a method for preparing mRNA by using the cap analog.

Provided is a composition or kit for preparing 5'-capped mRNA, including the cap analog.

Provided is a pharmaceutical composition for expressing a target peptide or protein, including the cap analog.

Provided is a cell including mRNA 5'-capped with the cap analog.

Provided is a cell including a protein or peptide translated from mRNA 5'-capped with the cap analog.

Technical Solution

According to an aspect of the present disclosure, a compound of Chemical Formula 1 below or a pharmaceutically acceptable salt thereof is provided:

[Chemical Formula 1]

wherein n=0,1, or 2;

$Y_1$, $Y_2$, and $Y_3$ are each independently O or S;

$R_1$ is $C_{1-6}$ alkyl or $CH_2Ph$;

$R_2$ and $R_3$ are each independently H or a sulfonyl-containing group, wherein at least one of $R_2$ and $R_3$ is a sulfonyl-containing group, and the sulfonyl-containing group is independently selected from the group consisting of mesyl, esyl, triflyl, tresyl, tosyl, brosyl, nosyl, and dansyl groups;

$R_4$ and $R_5$ are each independently OH or methoxy;

$R_6$ is OH or a mononucleotide or oligonucleotide having 1 to 7 bases; and

Z and Z' are each independently a natural, modified, or unnatural nucleoside base.

Another aspect provides a cap analog that is the compound of Chemical Formula 1.

Another aspect provides mRNA 5'-capped with the cap analog.

Another aspect provides a method for preparing 5'-capped mRNA including adding the cap analog during synthesis of the mRNA.

Another aspect provides a composition or kit for preparing 5'-capped mRNA including the cap analog.

Another aspect provides a pharmaceutical composition for expressing a target peptide or protein including mRNA 5'-capped with the cap analog and a pharmaceutically acceptable carrier.

Another aspect provides a cell including mRNA 5'-capped with the cap analog.

Another aspect provides a cell including a protein or peptide translated from mRNA 5'-capped with the cap analog.

Advantageous Effects

The cap analog according to one aspect, like the TriLink's trinucleotide cap analog, may be used in synthesis of mRNA to increase in vitro transcription efficiency of 5'-capped mRNA molecules and increase peptide or protein expression efficiency by capped mRNA. Particularly, because initial protein expression (initial translation) after transfection may further be increased in a cap dependent translation manner, the cap analog may be useful particularly for expression of a gene in which initial protein expression is important (for example, expression of nsp1 in self-amplifying RNA). In addition, because the cap analog may be economically synthesized in terms of time and cost by reducing the number of synthesis steps and purifications, the cap analog may contribute to synthesis of 5'-capped mRNA with high economic feasibility together with an increase in expression efficiency of peptide or protein by using the capped mRNA.

Therefore, the cap analog, similar to the currently commercialized trinucleotide cap analog, may increase in vitro transcription efficiency of 5'-capped mRNA molecules and significantly increase peptide or protein expression efficiency by the capped mRNA compared to conventional trinucleotide cap analogs, and may be economically produced.

As such, because the cap analog has excellent advantages in terms of efficacy and production cost, mRNA including the cap analog according to the present disclosure may be very effectively used to treat or prevent diseases of mammals including humans.

MODE FOR INVENTION

Hereinafter, the present disclosure will be described in detail.

Unless otherwise defined, all technical terms used herein have the same meaning as commonly understood by one of ordinary skill in the art to which the present disclosure belongs. Although preferred methods or samples are described in the specifications, those similar or equivalent thereto may also be regarded within the scope of the present disclosure. Throughout the specification, numerical values are considered to include the meaning of "about" even if not specified. The contents of all publications disclosed herein are incorporated by reference in their entirety.

DEFINITION OF TERMS

Terms used herein have the same meaning as defined below, unless otherwise specified.

In the context of a complex of a cap analog and a DNA template, the term, as used herein, "complementary" or "complementarity" refers to standard Watson/Crick base pairing rules. For example, sequence "5'-A-G-T-C-3'" is complementary to sequence "3'-T-C-A-G-5'". Complementarity does not need to be perfect; duplex may contain mismatched base pairs, degenerative, or unmatched nucleotides. Those skilled in the art may determine duplex stability by experimentally considering a number of variables including, for example, length of oligonucleotides, base composition and sequence of oligonucleotides, incidence of mismatched base pairs, ionic strength, components of a hybridization buffer, and rection conditions.

Complementarity may be "complete" or "entire" where all of the nucleotide bases of two nucleic acid strands are matched according to recognized base pairing rules, it may be "partial" in which only some of the nucleotide bases of a cap analog and a DNA target are matched according to recognized base pairing rules, or it may be "absent" where none of the nucleotide bases of two nucleic acid strands are matched according to recognized base pairing rules.

As used herein, the term "nucleoside" includes all naturally occurring nucleosides. Base rings most commonly found in naturally occurring nucleosides are purine and pyrimidine rings. Naturally occurring purine rings include, for example, adenine, guanine, and N6-methyladenine. Naturally occurring pyrimidine rings include, for example, cytosine, thymine, 5-methylcytosine, and uracil. Naturally occurring nucleosides include, for example, ribo, 2'-O-methyl, or 2'-deoxyribo derivatives of adenosine, guanosine, cytidine, thymidine, uridine, inosine, 7-methylguanosine, or uridine, but are not limited thereto.

As used herein, the terms "nucleoside analog", "modified nucleoside" or "nucleoside derivative" include synthetic nucleosides as described herein. Nucleoside derivatives also include nucleosides having modified base or/and sugar moieties, with or without protecting groups, for example, 2'-deoxy-2'-fluorouridine, 5-fluorouridine, or the like. The compounds and methods provided herein include such base rings and synthetic analogs thereof, as well as unnatural heterocycle-substituted base sugars, and acyclic substituted base sugars. Other nucleoside derivatives that may be used in the present disclosure include, for example, LNA nucleosides, halogen-substituted purines (e.g., 6-fluoropurine), halogen-substituted pyrimidines, N6-ethyladenine, N4-(alkyl)-cytosine, 5-ethylcytosine, and the like (U.S. Pat. No. 6,762,298).

The term "base of modified nucleoside" refers to a base of the "modified nucleoside" and includes, for example, halogen-substituted purines (e.g., 6-fluoropurine), halogen-substituted pyrimidines, N6-ethyladenine, N4-(alkyl)-cytosine, and 5-ethylcytosine.

The term "$C_{1-n}$ alkyl" refers to a linear or branched saturated hydrocarbon radical chain including 1 to n carbon atoms. Examples thereof may include methyl, ethyl, n-propyl, isopropyl, n-butyl, isobutyl, t-butyl, n-pentyl, isopentyl, and n-hexyl, but are not limited thereto.

In the process of synthesizing substances, "In situ method" refers to performing a next step of a reaction in an original container without additional purification of an obtained product.

An aspect provides a compound of Chemical Formula 1 below or a pharmaceutically acceptable salt thereof:

[Chemical Formula 1]

wherein n=0, 1, or 2;

$Y_1$, $Y_2$, and $Y_3$ are each independently O or S;

$R_1$ is $C_{1-6}$ alkyl or $CH_2Ph$;

$R_2$ and $R_3$ are each independently H or a sulfonyl-containing group, wherein at least one of $R_2$ and $R_3$ is a sulfonyl-containing group, and the sulfonyl-containing group is independently selected from the group consisting of mesyl, esyl, triflyl, tresyl, tosyl, brosyl, nosyl, and dansyl groups;

$R_4$ and $R_5$ are each independently OH or methoxy;

$R_6$ is OH or a mononucleotide or oligonucleotide having 1 to 7 bases; and

Z and Z' are each independently a natural, modified, or unnatural nucleoside base.

The pharmaceutically acceptable salt refers to a salt commonly used in the pharmaceutical field and, specifically, a base addition salt. The salt may be, for example, a monovalent metal salt, a divalent metal salt, an amine salt, or an amino acid salt. The monovalent metal salt may be Na, Li, or K salt, the divalent metal salt may be Ca, Zn, or Mg salt, the amine salt may be trimethylamine, triethylamine, ammonia, pyridine, or picoline salt, and the amino acid salt may be arginine, lysine, or histidine salt, without being limited thereto.

The pharmaceutically acceptable salt may be in the form of a salt that allows the compound of Chemical Formula 1 to form a stable, electrically neutral form in an aqueous liquid.

The compound of Chemical Formula 1 or a pharmaceutically acceptable salt thereof may be a compound of Chemical Formula 1a below:

[Chemical Formula 1a]

wherein n=0, 1, or 2;

$X_1$, $X_2$, $X_3$, and $X_4$ are each independently absent, or a monovalent metal ion, a divalent metal ion, or a combination thereof, wherein $X_1$, $X_2$, $X_3$, and $X_4$ are selected to electrically neutralize the compound of Chemical Formula 1;

$Y_1$, $Y_2$, and $Y_3$ are each independently O or S;

$R_1$ is $C_{1-6}$ alkyl or $CH_2Ph$;

$R_2$ and $R_3$ are each independently H or a sulfonyl-containing group, wherein at least one of $R_2$ and $R_3$ is a sulfonyl-containing group, and the sulfonyl-containing group is independently selected from the group consisting of mesyl, esyl, triflyl, tresyl, tosyl, brosyl, nosyl, and dansyl groups;

$R_4$ and $R_5$ are each independently OH or methoxy;

$R_6$ is OH or a mononucleotide or oligonucleotide having 1 to 7 bases;

Z and Z' are each independently a natural, modified, or unnatural nucleoside base.

In an embodiment, the monovalent metal ion is selected from the group consisting of $Na^+$, $Li^+$, and $K^+$, and the divalent metal ion is selected from the group consisting of $Mg^{2+}$, $Zn^{2+}$, and $Ca^{2+}$.

In an embodiment, the sulfonyl-containing group is mesyl, esyl, or tosyl group.

In an embodiment, the $C_{1-6}$ alkyl is methyl, ethyl, propyl, isopropyl, or t-butyl.

In an embodiment, in Chemical Formula 1, Z and Z' are each independently a natural purine or pyrimidine base moiety or a modified form thereof. More specifically, the Z and Z' may be each independently selected from the group consisting of guanine, adenine, cytosine, thymine, uracil, and modified forms thereof, and in an embodiment, Z and Z' are adenine and guanine, respectively.

In an embodiment, in Chemical Formula 1, $R_6$ is OH, a mononucleotide, or an oligonucleotide having 2 to 5 bases.

In an embodiment, the compound having a structure of Chemical Formula 1a is as follows.

In Chemical Formula 1a, n=0, 1, or 2;

$X_1$, $X_2$, $X_3$, and $X_4$ are each independently absent or Na;

$Y_1$, $Y_2$, and $Y_3$ are each independently O or S;

$R_1$ is $C_{1-6}$ alkyl;

$R_2$ and $R_3$ are each independently H or a sulfonyl-containing group, wherein at least one of $R_2$ and $R_3$ is a sulfonyl-containing group, and the sulfonyl-containing group is independently selected from the group consisting of mesyl, esyl, and tosyl groups;

$R_4$ and $R_5$ are each independently OH or methoxy;

$R_6$ is OH or a mononucleotide or oligonucleotide having 1 to 3 bases; and Z is a natural, modified, or unnatural nucleoside base.

In an embodiment, the $R_4$ is methoxy, and $R_5$ is OH.

In an embodiment, the compound of Chemical Formula 1 is a compound selected from the group consisting of compounds listed in Table 1 below:

TABLE 1

| Example | Structural Formula | Compound Name |
|---|---|---|
| 8 |  | $^{7m}G_{(3'OMs)}pppA_{(2'OMe)}pG$ |
| 9 |  | $^{7m}G_{(3'OEs)}pppA_{(2'OMe)}pG$ |

TABLE 1-continued

| Example | Structural Formula | Compound Name |
|---|---|---|
| 10 | | $^{7m}G_{(3'OTs)}pppA_{(2'OMe)}pG$ |

In the abbreviated compound names, the G is guanosine, 7mG is 7-methylguanosine, A is adenosine, p is —P(=O)(OH)O—, Es is esyl, Ms is mesyl, Ts is tosyl, and Me is methyl.

The compound of Chemical Formula 1 may be prepared according to a method shown in examples. Those skilled in the art may prepare the compound of Chemical Formula 1 by appropriately modifying the method shown in the examples below, for example, by modifying conditions, order, and compounds of reaction.

The compound of Chemical Formula 1 according to an embodiment may be prepared by a method shown in Reaction Scheme 2a below.

Details of the preparation method shown in the reaction scheme above are described in the following examples.

Reaction Scheme 2a may be expressed briefly with abbreviations below.

[Reaction Scheme 2a]

Here, the G is guanosine, 7mG is 7-methylguanosine, A is adenosine p is —P(=O)(OH)O—, TBS is tert-butylmethylsilyl, Me is methyl, Im is imidazolide, and Ms is mesyl.

According to the preparation method, the compound of Chemical Formula 1 may be prepared by four steps. Thus, the compound of Chemical Formula 1 may be prepared more economically by reducing the number of steps compared to conventional methods for preparing cap analogs.

The compound of Chemical Formula 1 according to an embodiment may be used as a cap analog. Therefore, 5'-capped mRNA may be prepared by using the cap analog that is the compound of Chemical Formula 1.

Therefore, one particular aspect provides a cap analog that is the compound of Chemical Formula 1.

In addition, one particular aspect provides a method for preparing 5'-capped mRNA, the method including introducing a cap analog that is the compound of Chemical Formula 1 during synthesis of mRNA.

In addition, one particular aspect provides a composition or kit for preparing 5'-capped mRNA including the cap analog that is the compound of Chemical Formula 1.

In addition, one particular aspect provides a use of a cap analog that is the compound of Chemical Formula 1 for synthesis of mRNA.

In addition, one particular aspect provides mRNA 5'-capped with a cap analog that is the compound of Chemical Formula 1.

The method for preparing the 5'-capped mRNA by using the cap analog that is the compound of Chemical Formula 1 may be performed according to any method known in the art. In an embodiment, the 5'-capped mRNA may be prepared by the co-transcriptional capping method, which is a method of mRNA synthesis in which a chemically synthesized cap analog is simultaneously introduced during in vitro mRNA synthesis and the cap analog constitutes the 5' end. Specifically, the method may include: steps of introducing a cap analog that is a compound of Formula 1 into a mixture including an RNA polymerase under conditions in which transcription of a polynucleotide template occurs by the RNA polymerase; and incubating the mixture for a time sufficient to allow transcription of the template. A cap analog including a compound of Formula 1 according to an aspect may increase the efficiency of transcription of an in vitro mRNA compared to the efficacy of initiation utilizing standard GTP, ATP, CTP or UTP, and subsequently increase the efficiency of protein expression of the transcribed capped mRNA during translation. Due to the increase in transcriptional efficiency, the synthesis of the mRNA may be increased by, for example, about 10%, about 20%, about 40%, about 60%, about 80%, about 90%, about 100%, about 150%, about 200%, or about 500% compared to synthesizing the mRNA by typical methods.

The cap analog according to an aspect, which is the compound of Chemical Formula 1, may significantly increase protein expression levels of 5'-capped mRNA molecules compared to the conventional TriLink's trinucleotide cap analog ($7mG_{(3'oMe)}pppA_{(2'oMe)}pG$). More specifically, mRNA molecules 5'-capped with a cap analog, in which 3'-OH residue of the compound of Chemical Formula 1 is monosulfonylated, may significantly increase initial protein expression after transfection compared to the conventional TriLink's trinucleotide 3'-methoxy cap analog ($7mG_{(3'oMe)}pppA_{(2'oMe)}pG$), thereby significantly increasing the overall protein expression levels (See Experimental Example 2).

The cap analog according to an aspect, which is the compound of Chemical Formula 1, has advantages of being synthesized economically in terms of time and cost by reducing the number of synthesis steps and column purifications compared to the TriLink's trinucleotide cap analog.

In more detail, by selecting an optimized starting material (e.g., $G_{(2'TBS)}$) in the preparation of the compound of Chemical Formula 1, the conventional two-step process of converting guanosine into guanosine monophosphate and then diphosphate may be simplified to a one-step process of directly converting guanosine into diphosphate, and the following process of 7-methylation of guanosine may be conducted in situ to shorten a crystallization/purification process. More specifically, by performing mesylation of 3' and 5'OH at the starting material ($G_{(2'TBS)}$) and then preparing 7-methylguanosine diphosphate ($pp^{7m}G$), the synthesis steps to 7-methylguanosine diphosphate ($pp^{7m}G$) may be shortened by two steps compared to the conventional TriLink's method for preparing the trinucleotide cap analog (method of [Reaction Scheme 1] below). In addition, while the TriLink's method for preparing the trinucleotide cap analog $7mG_{(3'OMe)}pppN_{(2'oMe)}pN$ requires a total of 5 ion-exchange column purifications as shown in Reaction Scheme 1 below (to be purified: $pG_{(3'oMe)}$, $ppG_{(3'OMe)}$, $pp^{7m}G_{(3'Ome)}$, $pN_{(2'OMe)}pN$, and $^{7m}G_{(3'oMe)}pppN_{(2'OMe)}pN$) (See U.S. Pat. No. 10,913,768), the cap analog including the compound of Chemical Formula 1 may be prepared by a total of 3 ion-exchange column purifications as shown in Reaction Scheme 2 below (to be purified: $pp^{7m}G_{(3'oR)}$, $pN_{(2'OMe)}pN$, and $^{7m}G_{(3'OR)}pppN_{(2'OMe)}pN$). Therefore, the cap analog of the compound of Chemical Formula 1 according to one aspect may be prepared by shortening the synthesis process and using a significantly reduced purification processes compared to conventional cap analogs.

[Reaction Scheme 1]

[Reaction Scheme 2]

In Reaction Schemes 1 and 2, the G is guanosine, $^{7m}G$ is 7-methylguanosine, N is one of adenosine, cytidine, guanosine, and uridine, p is —P(=O)O$_2$—, TBS is tert-butyldimethylsilyl, Me is methyl, Im is imidazolide, R is a substituent selected from the group consisting of tosyl, brosyl, nosyl, esyl, mesyl, triflyl, tresyl, and dansyl groups.

Therefore, the cap analog of the compound of Chemical Formula 1 according to one aspect have advantages of further lowering manufacturing time and cost of the cap analog.

In an embodiment, according to the method for preparing the 5'-capped mRNA, at least one modified NTP may further be added to a transcription reaction. Modification of the at least one modified NTP does not substantially impair RNA polymerase-mediated synthesis of mRNA. The modified NTP may include, for example, at least one modified nucleoside base, at least one modified sugar, and at least one modified 5'-triphosphate. As such, the modified NTP may be incorporated onto the 3'-end of the cap analog, which supports additional elongation of a primer without blocking transcription. A modification group of the modified NTP may be a detectable label or detectable marker. Therefore, after transcription, prepared mRNA containing the detectable label or marker may be identified by size, mass, color, and/or affinity capture. In an embodiment, the detectable label or marker is a fluorescent dye, and the affinity capture label is biotin.

In an embodiment, one or more components of transcription reaction (cap analog and/or NTP) may be labeled with a detectable label or marker. Thus, after transcription, mRNA molecules may be identified, for example, by size, mass, affinity capture, and color. For example, the detectable label is a fluorescent dye, and the affinity capture label is biotin.

The kit or composition for preparing the 5'-capped mRNA may include all common transcription reagents for synthesis of mRNA (e.g., FLuc mRNA). More specifically, the kit may include: a cap analog; a container marked for transcription; instructions for performing mRNA synthesis; at least one reagent selected from the group consisting of at least one unmodified NTP, at least one modified NTP (e.g., methylpseudouridine 5'-triphosphate), RNA polymerase, other enzymes, reaction buffers, magnesium, and DNA templates.

The 5'-capped mRNA prepared by using the cap analog according to an embodiment includes the cap analog in the structure, and the 5'-capped mRNA may be used to express proteins in vivo by administering the 5'-capped mRNA into a living organism.

Therefore, another aspect provides a method for expressing a target peptide or protein in vivo, the method including administering mRNA including the cap analog into a living organism.

In addition, another aspect provides a pharmaceutical composition for expressing a target peptide or protein including mRNA containing the cap analog and a pharmaceutically acceptable carrier.

In the present disclosure, the "target peptide or protein" refers to any protein to be expressed in vivo. In the present disclosure, the mRNA capable of expressing the target peptide or protein is 5'-capped with the cap analog according to an aspect to express the target protein in vivo.

According to types of the target peptide or protein, in vivo therapeutic or preventive effects on target diseases may be obtained. Therefore, the present disclosure may be used to treat or prevent any disease that may be treated or prevented by expression of the peptide or protein. Diseases that may be treated or prevented by expression of specific types of peptide or protein are known in the art, and the expression of the peptide or protein may be induced by using the pharmaceutical composition to be used to prevent or treat the diseases.

In addition, another embodiment provides a medical use of the cap analog-containing mRNA for preventing or treating any disease on which in vivo expression of peptide or protein is effective.

The pharmaceutical composition and treatment or prevention method may be used for treatment or prevention by using gene replacement therapy, genome editing, cancer immunotherapy, or vaccination. In an embodiment, the pharmaceutical composition is a mRNA vaccine.

The pharmaceutical composition may be formulated for administration by injection or any suitable route known to those skilled in the art to treat or prevent a certain condition. An injectable composition includes, for example, sterile saline solution as a pharmaceutically acceptable carrier. The injectable composition may be formulated as a suspension in lipids or phospholipids, a ribosomal suspension, or an aqueous solution. Methods for formulating the pharmaceutical composition are well known to those skilled in the art.

In an embodiment, the pharmaceutical composition may include the cap analog-containing mRNA, as an active ingredient, in a concentration of about 0.01% to 1%. The concentration may vary according to frequency of administration, dosage, administration method, and the like.

In an embodiment, the pharmaceutical composition may be administered to mammals, specifically, humans, the dosage may vary according to individual's health condition, severity of disease, body weight, age, race, and the like, and experts in the art may determine an appropriate dosage. In an embodiment, the dosage for humans may be in the range of 0.0001 to 100 mg/day, more specifically, the range of about 0.1 to 50 mg/day.

The cap analog-containing mRNA according to an embodiment may be introduced into cells in vivo or in vitro to express protein or peptide.

Therefore, another embodiment provides a cell including the cap analog-containing mRNA according to an aspect.

Another embodiment provides a cell including a protein or peptide translated from the cap analog-containing mRNA according to an aspect.

Methods for expressing proteins or peptides in cells in vivo or in vitro by using the mRNA are known in the art, and the proteins or peptides may be expressed in cells appropriately according to conventional methods.

EXAMPLES

Hereinafter, the present disclosure will be described in more detail with reference to the following examples. However, the following examples are merely presented to exemplify the present disclosure, and it will be apparent to those skilled in the art that modifications and variations could be made without departing from the scope and technical idea of the present disclosure as defined by the appended claims.

Description of Abbreviation

Abbreviations used herein are as follows.
TBDMS: tert-butyldimethylsilyl
MsCI: methanesulfonyl chloride
TEA.3HF: triethylamine trihydrofluoride
THF: tetrahydrofuran
ACN: acetonitrile
DMS: dimethylsulfate
PW: purified water
DPS: 2,2'-dipyridyl disulfide
TEA: triethylamine
PPh3: triphenylphosphine
DMF: dimethylformamide
DMTr: 4,4'-dimethoxytrityl
DTT: dithiothreitol
IVT: in vitro transcription Examples 1 to 3: Preparation of 7-methyl, 3'-mesyloxy-guanosine 5'-diphosphate imidazolide (Im-pp$^{7m}$G$_{(3'OMesyloxy)}$) (3)

-continued

Example 1: Preparation of 2'-O-tert-butyldimethylsilyl, 3'mesyloxy, 5'mesyloxy guanosine (1)

2'-O-tert-butyldimethylsilyl guanosine was commercially obtained and used as a starting material without further treatment. 3.97 g (9.99 mmol) of 2'-O-tert-butyldimethylsilyl guanosine was added to 91 ml of anhydrous pyridine, followed by stirring at 0° C. for 10 minutes while slowly adding 2.32 ml (29.97 mmol) of methane sulfonyl chloride. Subsequently, the reaction solution was stirred at 10 to 20° C. for 3 hours. 270 ml of distilled water was slowly added thereto at 0° C., followed by stirring at 5 to 10° C. for 1 hour. Crystals produced thereby were filtered, washed with distilled water, and then vacuum dried to obtain 4.36 g (yield: 80%) of a target compound (1).

$^1$H NMR (400 MHz, DMSO-d6, 25° C.): d=10.72 (s, 0.84H), 7.96 (s, 1H), 6.56 (1.65H), 5.80 (d, 1H), 5.15 (d, 1H), 4.96 (m, 1H), 4.56~4.62 (m, 3H, overlapped), 3.32 (m, 3H), 3.25 (m, 3H), 0.699 (m, 9H), −0.014 (m, 3H), −0.231 (m, 3H).

Example 2: Preparation of 7-methyl-3'-mesyloxy guanosine 5'-triethylammonium diphosphate (2)

4.2 g (7.59 mmol) of 2'-O-tert-butyldimethylsilyl, 3'mesyloxy, 5'mesyloxy guanosine (1) was dissolved in 33.6 mL of anhydrous acetonitrile, and 17.81 g (19.73 mmol) of tris(tetrabutylammonium) hydrogen pyrophosphate was added thereto, followed by stirring at room temperature for 48 hours. Then, the reaction solution was stirred for 1 hour at room temperature while slowing adding 3.71 mL (22.77 mmol) of triethylamine trihydrofluoride thereto. After washing by adding 42 ml of dichloromethane and 42 ml of purified water to the reaction solution, an aqueous layer was separated therefrom. After washing the separated aqueous layer by adding 42 ml of dichloromethane thereto, the aqueous layer was separated again. A pH of the separated aqueous layer was adjusted to 4.0 by using glacial acetic acid. 28.79 mL (303.6 mmol) of dimethylsulfate was slowly added to the reaction solution for 30 minutes, followed by stirring at room temperature for 3 hours. In this regard, the pH of the reaction solution was maintained at 4.0±0.5 by using a 1 M sodium hydroxide. The reaction solution was subject to extraction three times by using 126 mL of dichloromethane to remove unreacted dimethylsulfate, and then the aqueous layer was separated. The separated aqueous layer was titrated to pH 5.5 by using 1 M sodium hydroxide and the target compound was separated by using a DEAE Sepharose column (140×210 mm) and freeze-dried to obtain 1.68 g (yield 30.0%) of a triethylammonium salt of the target compound (2).

$^1$H NMR (400 MHz, D$_2$O, 25° C.): d=6.11 (d, 1H), 5.44 (dd, 1H), 5.02 (m, 1H), 4.74 (m, D$_2$O overlapped, 1H), 4.23 (m, 2H), 4.1 (s, 3H), 3.32 (s, 3H), 3.19~3.13 (m, 12H), 1.28~1.18 (m, 18H) $^{31}$P NMR (162 MHz, D$_2$O, 25° C.): d=−7.13 (d, 1P), −10.77 (d, 1P).

Example 3: Preparation of 7-methyl-3'-mesyloxy guanosine 5'-diphosphate imidazolide (3)

1.0 g (1.36 mmol) of 7-methyl-3'-mesyloxy guanosine 5'-triethylammonium diphosphate (2) was dissolved in 40 ml of dimethylformamide, and 0.93 g (13.6 mmol) of imidazole and 1.50 g (6.8 mmol) of 2,2'-dipyridyl disulfide were added thereto. 0.189 mL (1.36 mmol) of triethylamine and 1.78 g (6.8 mmol) of triphenylphosphine were added to the reaction solution, followed by stirring at room temperature for 2 hours. The reaction solution was added to a solution of 0.333 g (2.72 mmol) of sodium perchlorate dissolved in 320 mL of acetone, cooled to 4° C., and then crystals produced thereby were filtered, washed with cold acetone, and vacuum dried to obtain 0.83 g (yield 100.0%) of a sodium salt of the target compound (3).

1H NMR (400 MHz, D$_2$O, 25° C.): d=7.999 (s, 1H), 7.32 (s, 1H), 7.07 (s, 1H), 6.06 (d, 1H), 5.29 (m, 1H), 4.90 (m, 1H), 4.67 (m, 1H), 4.21~4.08 (m, 2H), 4.05 (s, 3H), 3.29 (s, 3H) $^{31}$P NMR (162 MHz, D$_2$O, 25° C.): d=−11.41 (d, 1P), −19.61 (d, 1P).

Examples 4 to 7: Preparation of pA(2'OMe)pG (7)

-continued

-continued (6)

(7)

Example 4: Preparation of N2-isobutyryl-2',3'-diacetoxy-guanosine (4)

After 2.4 g (3.66 mmol) of N2-isobutyryl-5'-O-DMT guanosine was dissolved in 12 ml of dichloromethane, a 1.47 ml (18.3 mmol) of pyridine and 1.78 ml (18.3 mmol) of acetic anhydride were added thereto, followed by stirring at room temperature for 5 hours. The reaction solution was subject to extraction by adding 24 ml of ethyl acetate thereto, followed by washing with 14.4 ml of a saturated sodium bicarbonate aqueous solution, 14.4 ml of a 20% citric acid aqueous solution, and 14.4 ml of distilled water. An organic layer was dried with sodium sulfate and distilled under reduced pressure, and the residue was dried under nitrogen for one day. 36 ml of a 3% trichloroacetic acid aqueous solution was added to the dried product and reacted at room temperature for 3 hours, and then 24 ml of methanol was added thereto and further reacted for 2 hours and 30 minutes. After the reaction solution was distilled under reduced pressure, 36 ml of dichloromethane and 18 ml of distilled water were added thereto, and then a saturated sodium bicarbonate aqueous solution was added thereto for neutralization. An organic layer was separated, dried with sodium sulfate, and distilled under reduced pressure. The residue distilled under reduced pressure was dissolved in 12 ml of ethylacetate and crystallized by slowly adding the solution to 108 ml of hexene. Crystals produced thereby were filtered, repeatedly washed 3 times with 12 ml of hexene, and vacuum dried to obtain 1.43 g (yield 89.6%) of a target compound (4). LC-MS (ESI, m/z)=438.16 [M+H$^+$]

Example 5: Preparation of (N2-isobutyryl-2',3'-diacetoxy-guanosinyl)-N6-benzoyl-2'-methoxy-adenosinyl cyanoethyl phosphate ester (5)

5'-O-DMT-N6-benzoyl-2'-methoxy-adenosine amidite was commercially obtained and used as a starting material without further treatment. 1.43 g (3.28 mmol) of N2-isobutyryl-2',3'-diacetoxy-guanosine (4) and 3.78 g (4.26 mmol) of 5'-O-DMT-N6-benzoyl-2'-methoxy-adenosine amidite were dissolved in 28.4 mL (0.45 M acetonitrile solution, 12.79 mmol) of 1H-tetrazole and stirred at room temperature for 1 hour. A solution, prepared by dissolving 544 mg (2.15 mmol) of iodine in 56.7 ml of a tetrahydrofuran:distilled water:pyridine mixed solution (v:v:v, 7:2:1), was added to the reaction solution and stirred for 45 minutes. After adding 7.2 ml of a 10% sodium thiosulfate aqueous solution to the reaction solution, 43 ml of dichloromethane and 14.3 ml of distilled water were added thereto, and an organic layer was separated therefrom. The separated organic layer was dried with sodium sulfate, distilled under reduced pressure, and dried under nitrogen for one day. 21.5 ml of a 3% trichloroacetic acid aqueous solution was added to the dried product and reacted at room temperature for 3 hours, and then 14.3 ml of methanol was added thereto and further reacted for 2 hours and 30 minutes. After the reaction solution was distilled under reduced pressure, 21.5 ml of dichloromethane and 10.7 ml of distilled water were added thereto, and then a saturated sodium bicarbonate aqueous solution was added thereto for neutralization. An organic layer separated therefrom was washed with distilled water, dried with sodium sulfate, and distilled under reduced pressure. The residue distilled under reduced pressure was dissolved in 28.6 ml of dichloromethane and crystallized by slowing adding 86 ml of methyl tert-butyl ether at room temperature. Crystals produced thereby were filtered and vacuum dried for one day to obtain 2.7 g (yield 87.8%) of a target compound (5). LC-MS (ESI, m/z)=938.28 [M+H$^+$]

Example 6: Preparation of p(OCE)$_2$A$^{bz}$(2'OMe)p(OCE)G$^{ib}$(2',3'OAc) (6)

2 g (2.13 mmol) of (N2-isobutyryl-2',3'-diacetoxy-guanosinyl)-N6-benzoyl-2'-methoxy-adenosinyl cyanoethyl phosphate ester (5), 1.11 ml (4.26 mmol) of bis(2-cyanoethyl)-N,N-diisopropylphosphoamidite were dissolved in 9.47 mL (0.45 M acetonitrile solution, 4.26 mmol) of 1H-tetrazole and stirred at room temperature for 30 minutes. A solution obtained by dissolving 811 mg (3.2 mmol) of iodine in 30 ml of a tetrahydrofuran:distilled water:pyridine mixed solution (v:v:v, 7:2:1) was added to the reaction solution and stirred for 30 minutes. After adding 20 ml of a 10% sodium thiosulfate aqueous solution to the reaction solution, 100 ml of dichloromethane and 40 ml of distilled water were added thereto, and then an organic layer was separated therefrom. The separated organic layer was dried with sodium sulfate and distilled under reduced pressure. A concentrate obtained by the distillation under reduced pressure was dissolved in 27 ml of dichloromethane and crystallized by slowly adding the solution to 133 ml of methyl tert-butyl ether at room temperature. Crystals produced thereby were filtered and vacuum dried for one day to obtain 2.2 g (yield 92.2%) of a target compound (6). LC-MS (ESI, m/z)=1124.30 [M+H$^+$]

Example 7: Preparation of pA(2'OMe)pG (7)

2 g (1.78 mmol) of p(OCE)$_2$A$^{bz}$(2'OMe)p(OCE)G$^{ib}$(2',3'OAc) (6) was added to a mixed solution of 44 mL of methanol and 44 mL of conc. ammonia and stirred at 50 to 55° C. for 24 hours. Upon completion of the reaction, the solvent was distilled under reduced pressure, and 20 mL of methanol was added to the concentrate, followed by distillation 3 times. The concentrate was dissolved in distilled water and purified by using a DEAE Sepharose column and reversed phase chromatography to obtain 1.13 g (yield 70%) of a triethylammonium salt of the target compound (7).

$^1$H NMR (400 MHz, D$_2$O, 25° C.): d=8.44 (s, 1H), 8.12 (s, 1H), 7.90 (s, 1H), 6.07 (m, 1H), 5.80 (m, 1H), 4.46~4.01 (m, 8H), 3.45 (m, 3H) LC-MS (ESI, m/z)=707.13 [M+H+]

Example 8: Preparation of $^{7m}$G$_{(3'OMs)}$pppA$_{(2'oMe)}$pG (8)

(8)

0.55 g of magnesium chloride was dissolved in 27.5 mL of dimethylformamide. 0.6 g (0.99 mmol) of Im-$^{PP}$7mG (3'OMs) (3) and 0.5 g (0.55 mmol) of pA(2'OMe)pG (7) were added to the reaction solution and stirred at room temperature for 24 hours. Upon completion of the reaction, the reaction was terminated by adding dropwise 275 mL of a 25 mM ethylenediaminetetraacetic acid aqueous solution thereto, and the reaction solution was cooled to room temperature and neutralized with a 1M sodium bicarbonate aqueous solution. The reaction solution was purified by using a DEAE Sepharose column (140×210 mm), distilled, and vacuum dried. The dried solid was dissolved in 2.5 ml of distilled water and then added to a solution of 299 mg (2.44 mmol) of sodium perchlorate in 15 mL of acetone, cooled to 4° C., the generated crystal was filtered, washed with cold acetone, and vacuum dried to obtain 0.43 g (yield 60.0%) of a sodium salt of the target compound (8).

$^1$H NMR (400 MHz, D$_2$O, 25° C.): d=8.28 (s, 1H), 8.05 (s, 1H), 7.89 (s, 1H), 5.92 (d, 1H), 5.82 (d, 1H), 5.77 (d, 1H), 5.33 (m, 1H), 4.59~4.12 (m, overlapped, 13H), 4.00 (s, 3H), 3.39 (s, 3H), 3.29 (s, 3H) $^{31}$P NMR (162 MHz, D$_2$O, 25° C.): d=−0.27 (s, 1P), −10.88 (dd, 2P), −22.29 (t, 1P). LC-MS (ESI, m/z)=1224.13 [M+H$^+$].

Experimental Example 1: In Vitro Transcription of Luciferase mRNA Capped by Co-Transcriptional Capping For mRNA synthesis reaction using the compound of Example 8 as a cap analog, a transcription mixture including a 100 ng/ml firefly luciferase DNA transcription template (including poly A 101), 5 mM ATP, CTP, GTP, and 1-N-methyl-pseudouridine 5'-triphosphate (me$^1$øTP), 4 mM compound of Example 8, 10 U/ml T7 RNA polymerase (New England Biolab #dy1670), 1 U/ml RNase inhibiting protein, 0.01 U/ml inorganic pyrophosphatase, 40 mM Tris·HCl (pH 8.0), 20 mM magnesium acetate, 1 mM spermidine, and 10 mM DTT was prepared. As a comparative example, a transcription mixture was prepared by adding the TriLink's trinucleotide cap analog $^{m7}$G$_{(3'Ome)}$pppA$_{(2'oMe)}$pG, instead of the compound of Example 8, under the same conditions. Each of the prepared transcription mixtures was reacted at 37° C. for 1 to 4 hours. Then, for termination of reaction, 10 mM Tris·HCl (pH 7.5), 2.5 mM magnesium chloride, 0.1 mM calcium chloride, and 100 U/mL DNase I (Thermo Fisher Catalog #2270A) were added to the reactants and reacted at 25° C. for 1 hour. After the reaction was completed, mRNA was purified by a Monarch® RNA Cleanup Kit of New England Biolabs or reverse-phase high-performance liquid chromatography according to manufacturer's instructions. Concentration of the purified mRNA was measured by using a Nanodrop spectrophotometer of Thermo Scientific, and a total amount of mRNA was calculated by multiplying the concentration and reaction volume. Then, in order to derive a mRNA in vitro transcription (IVT) yield, the total amount of mRNA synthesized using each different cap analog was divided by the input L-DNA content to quantify the IVT yield value according to the cap analog. Specifically, the IVT yield value of 100 indicates that 100 μg of mRNA was synthesized by using 1 μg of L-DNA. This may be calculated by [Equation 1] below.

Subsequently, an IVT yield value [Equation 1] by $^{7m}$G$_{(3'OMe)}$pppA$_{(2'OMe)}$pG, which is the TriLink's tri-nucleotide cap analog, was considered as 100%, and the IVT yield value [Equation 1] by the compound of each example was divided by the yield value of $^{7m}$G$_{(3'OMe)}$pppA$_{(2'OMe)}$pG [Equation 1] and multiplied by 100 to convert the IVT yield by the compound of Example 8 into a percentage (%) relative to that of $^{7m}$G$_{(3'oMe)}$pppA$_{(2'OMe)}$pG. This may be calculated by [Equation 2] below.

$$IVT \text{ yield value} = \text{total amount of synthesized mRNA/amount of added L-DNA} \quad [\text{Equation 1}]$$

$$IVT \text{ yield } (\%) = \{IVT \text{ yield value by compound of each example [Equation 1]}/IVT \text{ yield value by } {}^{7m}G_{(3'OMe)}pppA_{(2'OMe)}pG \text{ [Equation 1]}\} \times 100 \quad [\text{Equation 2}]$$

The IVT yield values by the compound of Example 8 or $^{7m}$G$_{(3'oMe)}$pppA$_{(2'oMe)}$pG were independently repeated 3 times, and significance was verified through the unpaired t-test. The results are shown in FIG. 1.

Figure 1:
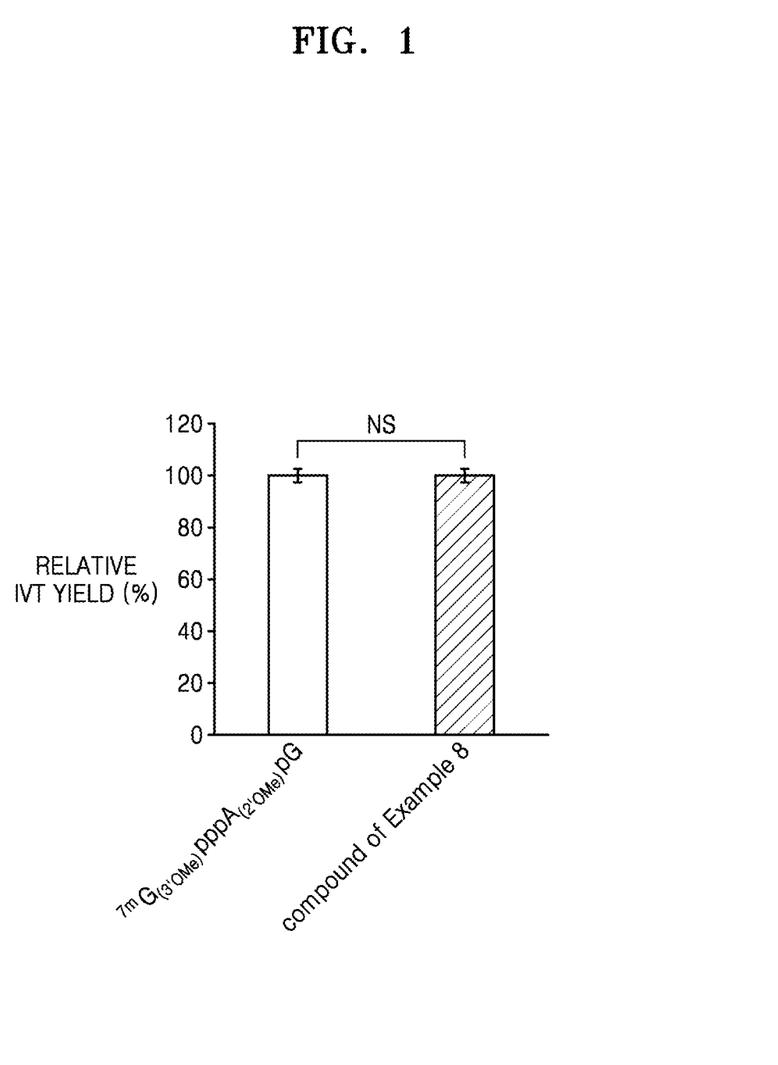
FIG. 1 is a graph showing relative in-vitro transcription (IVT) yield (%) of a compound (8) of Example 8 relative to $^{7m}G_{(3'OMe)}pppA_{(2'OMe)}pG$ after measuring IVT yield of luciferase mRNA capped with the compound (8) of Example 8 according to an embodiment or $^{7m}G_{(3'OMe)}pppA_{(2'OMe)}pG$ as a cap analog.

Referring to FIG. 1, it was confirmed that the IVT yield of the compound of Example 8 was almost same as that of the conventional third-generation cap analog of $^{7m}$G$_{(3'OMe)}$pppA$_{(2'OMe)}$pG. Therefore, it was confirmed that the compound according to an embodiment may be used to synthesize 5'-capped mRNA with a yield equivalent to that of the conventional third-generation cap analog of $^{7m}G_{(3'oMe)}pppA_{(2'oMe)}pG$.

Experimental Example 2: Translation of Capped Luciferase mRNA in HEK293T Cell

Figure 2:
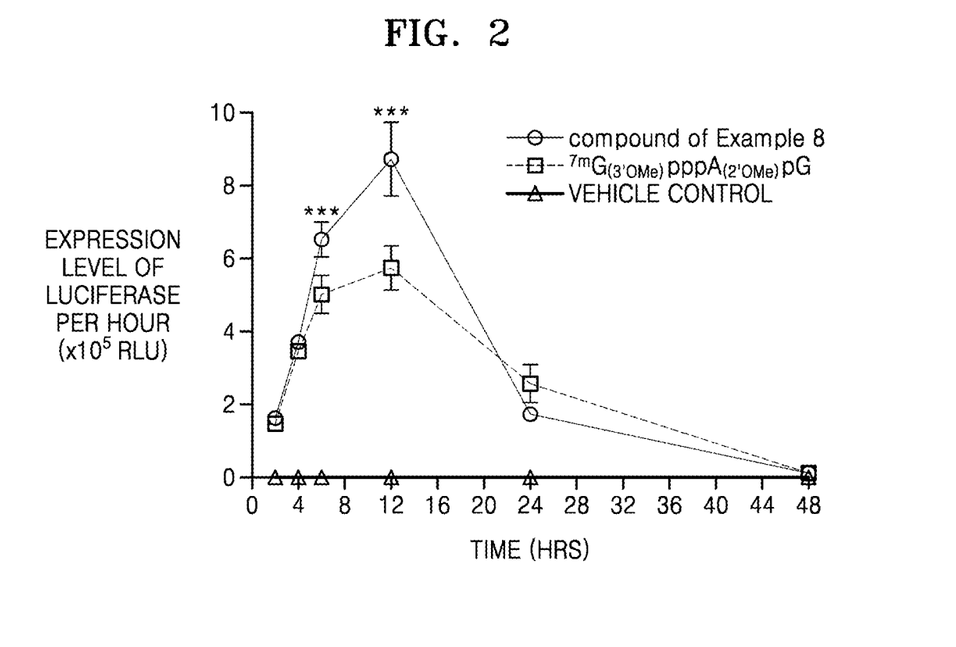
FIG. 2 is a graph showing results of quantifying expression levels of translated luciferase protein by measuring luciferase activity over time after transfecting HEK293T cell lines with luciferase mRNA prepared by in-vitro transcription using the compound (8) of Example 8 according to an embodiment or $^{7m}G_{(3'oMe)}pppA_{(2'OMe)}pG$ as a cap analog. Average±standard deviation (n=3), ***: P<0.05, NS: not significant.
Figure 3:
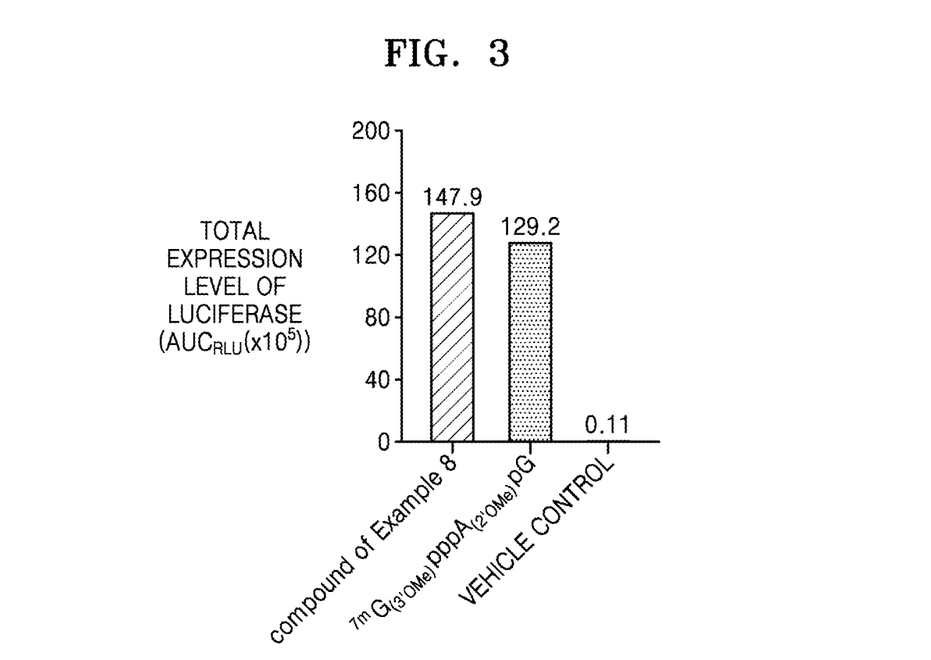
FIG. 3 is a graph showing results of total luciferase protein expression levels from 1 hour to 48 hours after transfection calculated as area under the curve (AUC) values after transfection with luciferase mRNA capped with the compound (8) of Example 8 according to an embodiment or $^{7m}G_{(3'oMe)}pppA_{(2'OMe)}pG$.

Translation activity of luciferase mRNAs respectively prepared by in vitro transcription of the compound of Example 8 or $^{7m}G_{(3'oMe)}pppA_{(2'oMe)}pG$ in Experimental Example 1 was evaluated in Human embryonic kidney 293T cell lines (HEK293T). HEK293T cells were incubated in DMEM supplemented with 10% FBS and 1% penicillin/streptomycin at 37° C. under an atmosphere of 5% $CO_2$. HEK293T cells were plated in a 6-well plate at a density of $1\times10^5$ cells/well. The next day, the cells per each well were transfected with 100 ng of mRNA by using a transfection reagent (messengerMAX lipofectamine; Invitrogen catalog #LMRNA003): according to recommendations of the transfection reagent manufacturer, 0.3 μL of the transection reagent was diluted in 5 μL of a complex medium (Opti-MEM; Life technologies) in Tube A and incubated at room temperature for 10 minutes, and 200 ng of the prepared capped luciferase mRNA was diluted 10 μL of Opti-MEM in Tube B. After mixing the solutions of Tubes A and B, the mixture was incubated at room temperature for 5 minutes. A vehicle control was made by incubation in the same manner except for the capped luciferase mRNA was excluded. Then, the cells were transfected by using the incubated mixed solution. The cells were harvested after 1, 4, 6, 12, 24, and 48 hours from the transfection and luciferase activity was measured by using a Dual-Glo® Luciferase Assay kit (Promega catalog #E2910) according to manufacturer's recommendations: after removing the medium of the transfected cells, 75 μl of phosphate-buffered saline (PBS) was added thereto. Subsequently, 75 μl of a Dual-Glo® reagent was further added thereto, followed by mixing and incubation for 10 minutes, and then firefly luciferase luminescence was measured by using a luminometer (Perkin Elmer). Then, 75 μl of a Dual-Glo® Stop&Glo® reagent was further added thereto, followed by incubation for 10 minutes, and then Renilla luciferase luminescence was measured. A ratio of firefly luciferase luminous value to a Renilla luciferase luminous value, a control was calculated, and then luciferase activity per hour relative right unit (RLU) was normalized, which is shown in FIG. 2. All luciferase activity tests were each independently repeated 3 times, and significance was verified by One-way ANOVA and Tukey's post hoc tests. In addition, to infer a total luciferase protein expression level from 1 hour to 48 hours after transfection, area under the curve (AUC) was calculated by using a GraphPad Prism. In order to obtain a peak area value, the luciferase values per each hour were plotted on the Y-axis and the corresponding time values were plotted on the X-axis to generate a curve as shown in FIG. 2. Then, total luciferase area values of the mRNA capped with the compound of Example 8 and the mRNA capped with $^{7m}G_{(3'oMe)}pppA_{(2'oMe)}pG$ for a total time were calculated by using a trapezoid rule of the Prism and shown in FIG. 3. A formula for calculating the area value in the Prism is as follows.

$$\Delta X * (Y1 + Y2)/2$$

The mRNA capped with the compound of Example 8 exhibited far higher luciferase activity than the conventional mRNA capped with $^{7m}G_{(3'oMe)}pppA_{(2'oMe)}pG$ from 6 hours (early time point) to 12 hours (See FIG. 2). Also, due to increased protein expression in the early stage of transfection, the mRNA capped with the compound of Example 8 exhibited a higher total protein expression level than the mRNA capped with $^{7m}G_{(3'oMe)}pppA_{(2'oMe)}pG$ (See FIG. 3).

Based on FIGS. 2 and 3, it was confirmed that the cap analog according to an aspect in which a sulfonyl group-containing group, instead of a methyl group, is introduced into 3'-hydrogyl group of methylguanosine had an effect on increases in protein expression compared to conventionally commercialized cap analogs.

The invention claimed is:

1. A compound of Chemical Formula 1 below or a pharmaceutically acceptable salt thereof:

[Chemical Formula 1]

wherein n=0, 1, or 2;

$Y_1$, $Y_2$, and $Y_3$ are each independently O or S;

$R_1$ is $C_{1-6}$ alkyl or $CH_2Ph$;

$R_2$ and $R_3$ are each independently H or a sulfonyl-containing group, wherein at least one of $R_2$ and $R_3$ is a sulfonyl-containing group, and the sulfonyl-containing group is independently selected from the group consisting of mesyl, esyl, triflyl, tresyl, tosyl, brosyl, nosyl, and dansyl groups;

$R_4$ and $R_5$ are each independently OH or methoxy;

$R_6$ is OH or a mononucleotide or oligonucleotide having 1 to 7 bases; and

Z and Z' are each independently a natural, modified or unnatural nucleoside base.

2. The compound of claim 1, wherein the compound has a structure of Chemical Formula 1a below:

[Chemical Formula 1a]

wherein n=0, 1, or 2;

$X_1$, $X_2$, $X_3$, and $X_4$ are each independently absent, or a monovalent metal ion, a divalent metal ion, or a combination thereof, wherein $X_1$, $X_2$, $X_3$, and $X_4$ are selected to electrically neutralize the compound of Chemical Formula 1;

$Y_1$, $Y_2$, and $Y_3$ are each independently O or S;

$R_1$ is $C_{1-6}$ alkyl or $CH_2Ph$;

$R_2$ and $R_3$ are each independently H or a sulfonyl-containing group, wherein at least one of $R_2$ and $R_3$ is a sulfonyl-containing group, and the sulfonyl-containing group is independently selected from the group consisting of mesyl, esyl, triflyl, tresyl, tosyl, brosyl, nosyl, and dansyl groups;

$R_4$ and $R_5$ are each independently OH or methoxy;

$R_6$ is OH or a mononucleotide or oligonucleotide having 1 to 7 bases; and

Z and Z' are each independently a natural, modified, or unnatural nucleoside base.

3. The compound of claim 2, wherein the monovalent metal ion is selected from the group consisting of Na+, Li+, and K+, and the divalent metal ion is selected from the group consisting of $Mg^{2+}$, $Zn^{2+}$, and $Ca^{2+}$.

4. The compound of claim 2, wherein Z and Z' are each independently selected from the group consisting of guanine, adenine, cytosine, thymine, uracil, and modified forms thereof.

5. The compound of claim 2, wherein n=0, 1, or 2;

$X_1$, $X_2$, $X_3$, and $X_4$ are each independently absent or Na;

$Y_1$, $Y_2$, and $Y_3$ are each independently O or S;

$R_1$ is $C_{1-6}$ alkyl;

$R_2$ and $R_3$ are each independently H or a sulfonyl-containing group, wherein at least one of $R_2$ and $R_3$ is a sulfonyl-containing group, and the sulfonyl-containing group is independently selected from the group consisting of mesyl, esyl, and tosyl groups;

$R_4$ and $R_5$ are each independently OH or methoxy;

$R_6$ is OH or a mononucleotide or oligonucleotide having 1 to 3 bases; and

Z and Z' are each independently a natural nucleoside base.

6. The compound of claim 1, wherein the compound comprises one selected from the group consisting of compounds represented by chemical formulae below and a pharmaceutically acceptable salt thereof:

$^{7m}G_{(3'OEsyl)}pppA_{(2'OMe)}pG$

-continued $^{7m}G_{(3'OMesyl)}pppA_{(2'OMe)}pG$ $^{7m}G_{(3'OTosyl)}pppA_{(2'OMe)}pG$ 7. An mRNA 5'-capped with a cap analog that is the compound according to claim 1.

8. A method for preparing 5'-capped mRNA, the method comprising adding a cap analog which is the compound according to claim 1, during synthesis of the mRNA.

9. A composition for preparing 5'-capped mRNA, comprising a cap analog that is the compound according to claim 1.

10. A pharmaceutical composition comprising: mRNA 5'-capped with a cap analog that is the compound according to claim 1 and a pharmaceutically acceptance carrier.

11. A cell comprising the 5'-capped mRNA of claim 7.

12. A cell comprising a protein or peptide translated from the 5'-capped mRNA of claim 7.

13. A kit for preparing 5'-capped mRNA, comprising a cap analog that is compound according to claim 1.

* * * * *